(12) United States Patent
Henderson et al.

(10) Patent No.: US 11,970,047 B2
(45) Date of Patent: Apr. 30, 2024

(54) RECREATIONAL VEHICLE AIR CONDITIONER AND METHODS OF OPERATION

(71) Applicant: Haier US Appliance Solutions, Inc., Wilmington, DE (US)

(72) Inventors: Richard Dustin Henderson, La Grange, KY (US); Tal Abraham Ohayon, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 565 days.

(21) Appl. No.: 17/108,571

(22) Filed: Dec. 1, 2020

(65) Prior Publication Data
US 2022/0169091 A1 Jun. 2, 2022

(51) Int. Cl.
*B60H 1/00* (2006.01)
*B60P 3/38* (2006.01)

(52) U.S. Cl.
CPC ..... *B60H 1/00985* (2013.01); *B60H 1/00364* (2013.01); *B60H 1/00978* (2013.01); *B60P 3/38* (2013.01)

(58) Field of Classification Search
CPC ............ B60H 1/00985; B60H 1/00978; B60H 1/00364; B60H 1/00371; B60H 2001/00235; B60H 1/00735; B60H 2001/0235; F24F 11/38; F24F 11/32
See application file for complete search history.

(56) References Cited

U.S. PATENT DOCUMENTS

| 7,305,291 | B2 | 12/2007 | Koenig et al. | |
|---|---|---|---|---|
| 2011/0137853 | A1* | 6/2011 | Mackay | G06Q 10/06 706/57 |
| 2013/0247600 | A1* | 9/2013 | Lu | F25D 17/067 62/89 |
| 2014/0262134 | A1* | 9/2014 | Arensmeier | F24F 11/77 165/11.2 |

(Continued)

FOREIGN PATENT DOCUMENTS

| AU | 2011265563 A1 * | 7/2012 | ......... F24F 11/0009 |
|---|---|---|---|
| CN | 105698479 A * | 6/2016 | |

(Continued)

OTHER PUBLICATIONS

CN110160206A English Machine Translation (Year: 2019).*

*Primary Examiner* — Jenna M Hopkins
(74) *Attorney, Agent, or Firm* — Dority & Manning, P.A.

(57) ABSTRACT

An air conditioning assembly for a recreational vehicle may include a sealed refrigeration system, a display screen, and a controller. The sealed refrigeration system may be mounted to the recreational vehicle. The display screen may be mounted to the recreational vehicle. The controller may be in operable communication with the sealed refrigeration system and the display screen. The controller may be configured to initiate a system operation. The system operation may include detecting the corresponding condition of the air conditioner assembly, presenting a variable field value at the discrete output field based on the detected corresponding condition, determining an anomaly at the air conditioner assembly, and changing the discrete output field to present a predetermined field value in response to determining the anomaly.

20 Claims, 8 Drawing Sheets

(56) References Cited

U.S. PATENT DOCUMENTS

| | | | | |
|---|---|---|---|---|
| 2014/0266755 | A1* | 9/2014 | Arensmeier | F24F 11/49 340/679 |
| 2015/0330650 | A1* | 11/2015 | Abiprojo | F24F 11/30 700/276 |
| 2019/0041882 | A1* | 2/2019 | Noboa | F24F 11/62 |
| 2019/0353372 | A1* | 11/2019 | Rigg | F24F 11/38 |
| 2019/0353373 | A1* | 11/2019 | Atchison | F24F 11/38 |
| 2020/0134891 | A1* | 4/2020 | Ohta | F24F 11/523 |
| 2022/0169091 | A1* | 6/2022 | Henderson | B60H 1/00985 |
| 2023/0153490 | A1* | 5/2023 | Lee | G06F 30/12 703/7 |

FOREIGN PATENT DOCUMENTS

| | | | | | |
|---|---|---|---|---|---|
| CN | 107576011 | A | * | 1/2018 | |
| CN | 110160206 | A | * | 8/2019 | |
| CN | 110500706 | A | * | 11/2019 | |
| CN | 110686368 | A | * | 1/2020 | F24F 11/38 |
| CN | 111197836 | A | * | 5/2020 | |
| CN | 116592486 | A | * | 8/2023 | F24F 11/523 |
| JP | S62163813 | A | * | 7/1987 | |
| JP | H0550840 | A | | 3/1993 | |
| JP | 3785871 | B2 | | 6/2006 | |
| KR | 100804659 | B1 | | 2/2008 | |

\* cited by examiner

RECREATIONAL VEHICLE AIR CONDITIONER AND METHODS OF OPERATION

FIELD OF THE INVENTION

The present subject matter relates generally to air conditioners in recreational vehicles, and more particularly to operation modes for air conditioner units.

BACKGROUND OF THE INVENTION

Certain recreational vehicles include an air conditioning system or assembly, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. For example, the indoor heat exchanger is positioned within an indoor portion of the RVAC and is in fluid communication with the passenger compartment through an opening in the roof. The outdoor heat exchanger is positioned within the outdoor portion and is separated from the indoor heat exchanger by a partition or divider.

For an assembled recreational vehicle, it is common to have one or more display screens dedicated to presenting information related to the air conditioning system, such as at a thermostat. Typically, such displays include one or more regions (i.e., fields) that are dedicated to showing one condition or aspect of the air conditioning system. As an example, a single temperature field may be provided on display to show the temperature within the recreational vehicle (e.g., a temperature value detected at a corresponding temperature sensor). As the temperature within the recreational vehicle changes, so does the temperature value presented at the temperature field. Additionally or alternatively, a dedicated field may be provided to show the selected mode of operation, fan state (e.g., off or on) etc.

Although a user may appreciate the presentation of a predetermined set of fields, this can create challenges. One of the challenges with existing systems is communicating information regarding one or more errors or anomalies that the air conditioning system may detect. For instance, it may be undesirable or confusing to have a dedicated field of the display for presenting information about a potential anomaly. Moreover, the air conditioning system may be designed to work with a variety of types of displays, so it can be difficult to that the display being used has the appropriate hardware or software to present information that is not related to day-to-day operations.

As a result, it would be useful to provide a sensor assembly having features to address one or more of the above issues. For instance, it may be advantageous to provide a system or method of operation for improved communication of information regarding a detected anomaly. Additionally or alternatively, it may be advantageous if such information could be communicated on a display screen that does not have a dedicated field for showing anomaly information.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an air conditioning assembly for a recreational vehicle is provided. The air conditioning assembly may include a sealed refrigeration system, a display screen, and a controller. The sealed refrigeration system may be mounted to the recreational vehicle. The display screen may be mounted to the recreational vehicle. The controller may be in operable communication with the sealed refrigeration system and the display screen. The controller may be configured to initiate a system operation. The system operation may include detecting the corresponding condition of the air conditioner assembly, presenting a variable field value at the discrete output field based on the detected corresponding condition, determining an anomaly at the air conditioner assembly, and changing the discrete output field to present a predetermined field value in response to determining the anomaly.

In another exemplary aspect of the present disclosure, a method of operating an air conditioning assembly is provided. The method may include detecting a corresponding condition of an air conditioning assembly. The method may also include presenting a variable field value at a discrete output field based on the detected corresponding condition. The method may further include determining an anomaly at the air conditioning assembly and changing the discrete output field to present a predetermined field value in response to determining the anomaly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
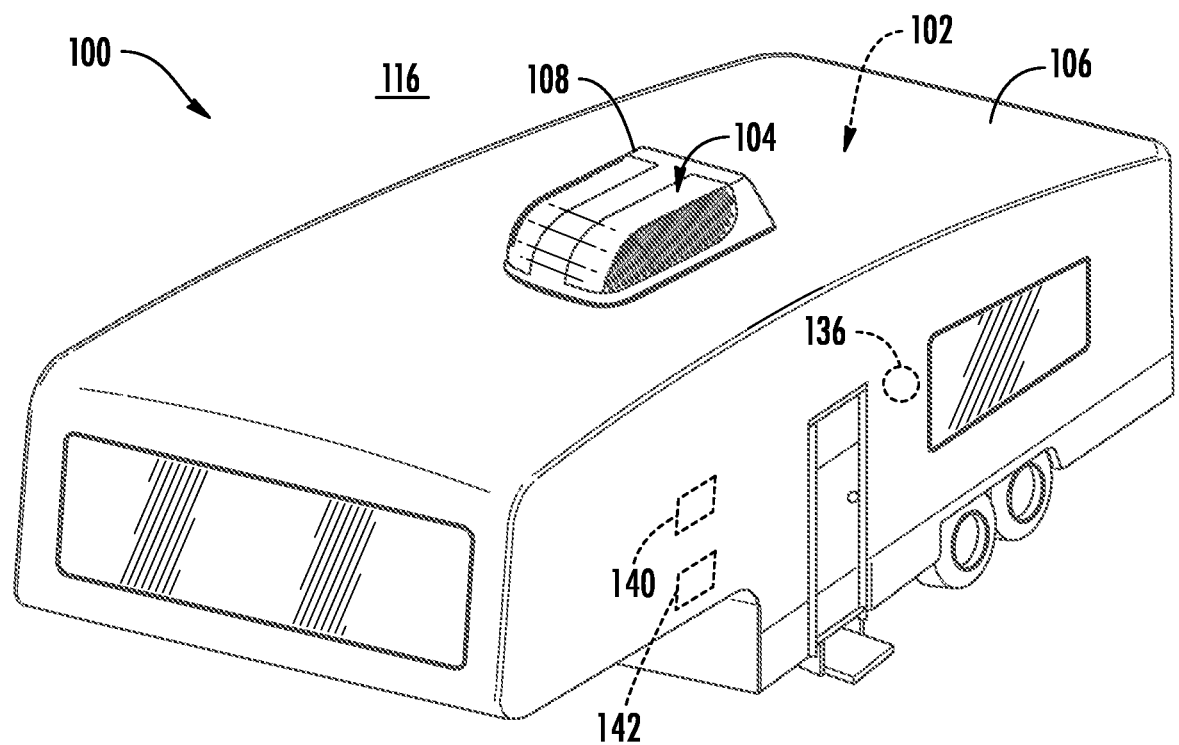
FIG. 1 provides a perspective view of a recreational vehicle according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

FIG. 1 provides a perspective view of an exemplary recreational vehicle 100 in accordance with the present disclosure. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment 102 of recreational vehicle 100, climate control of the passenger compartment is desirable.

Accordingly, an air conditioning system or air conditioner 104 may be mounted on recreational vehicle 100 to provide cooled air to the passenger compartment 102. Air conditioning system 104 is typically mounted to an outside surface 106 of recreational vehicle 100. This arrangement is desirable because a byproduct of operation of air conditioning system 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioning system 104 may be mounted on an outer surface 106, such as the ceiling or top of recreational vehicle 100. Also as shown in FIG. 1, air conditioning system 104 may include a top cover or outer grill 108 that is positioned over the working components air conditioning system 104, e.g., to protect such working components from rain, wind, debris, etc. Although an exemplary recreational vehicle is illustrated, it should be appreciated that air conditioner 104 may be used in or with any suitable recreational vehicle.

Figure 2:
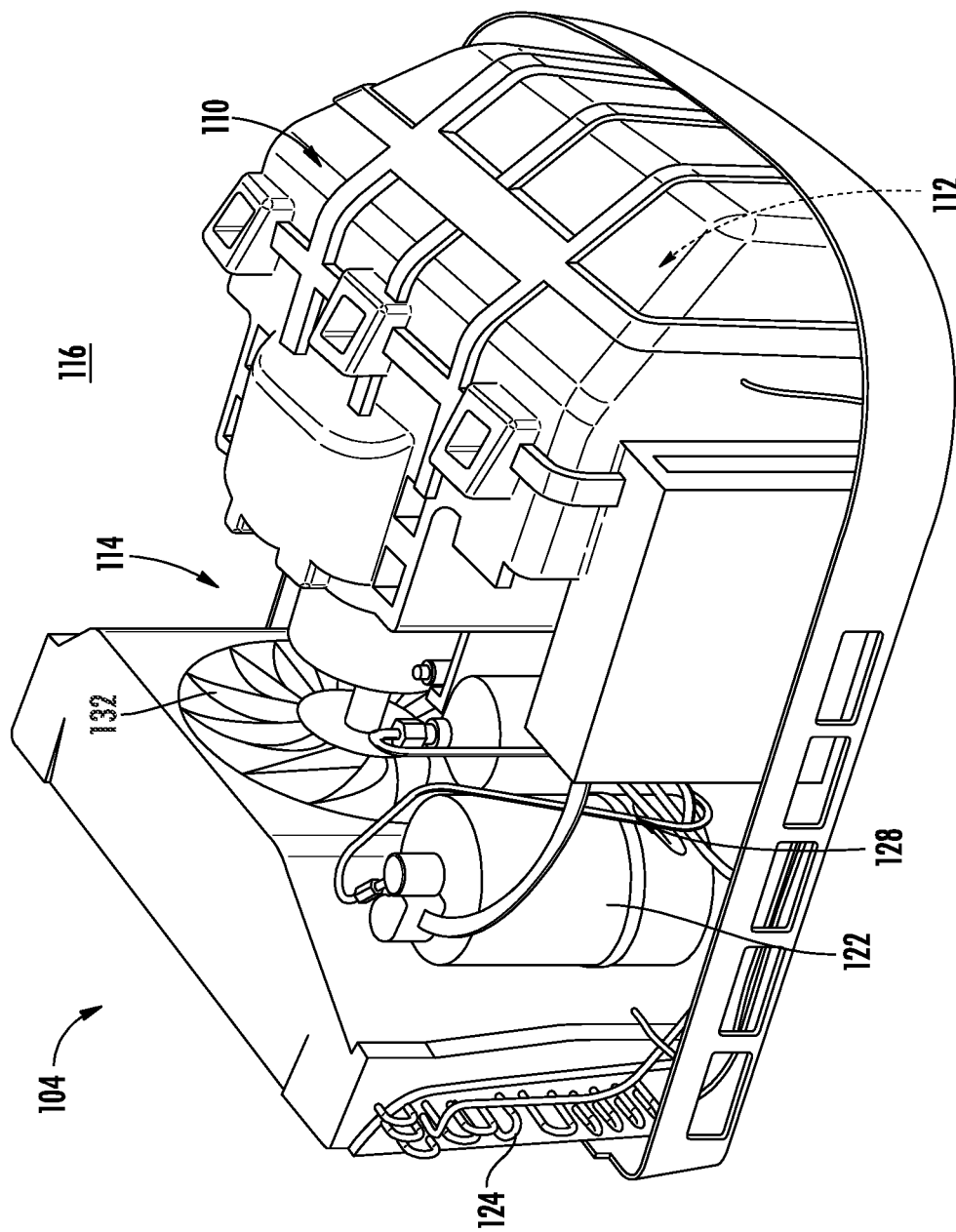
FIG. 2 provides a perspective view of a recreational vehicle air conditioner (RVAC) that may be used with the exemplary recreational vehicle of FIG. 1, with an outdoor cover removed for clarity.
Figure 3:
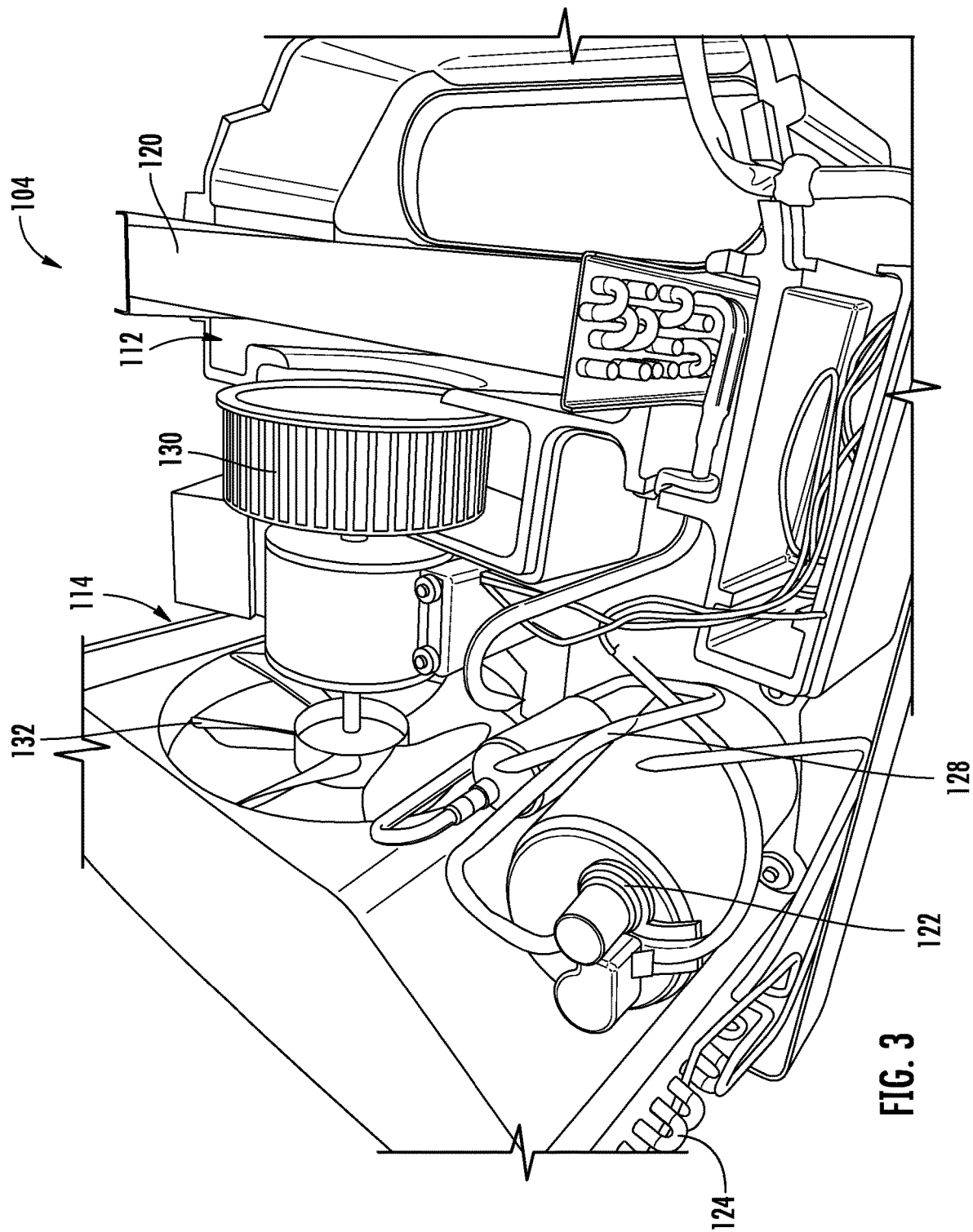
FIG. 3 provides a perspective view of the exemplary RVAC of FIG. 2 with an indoor cover removed for clarity.
Figure 4:
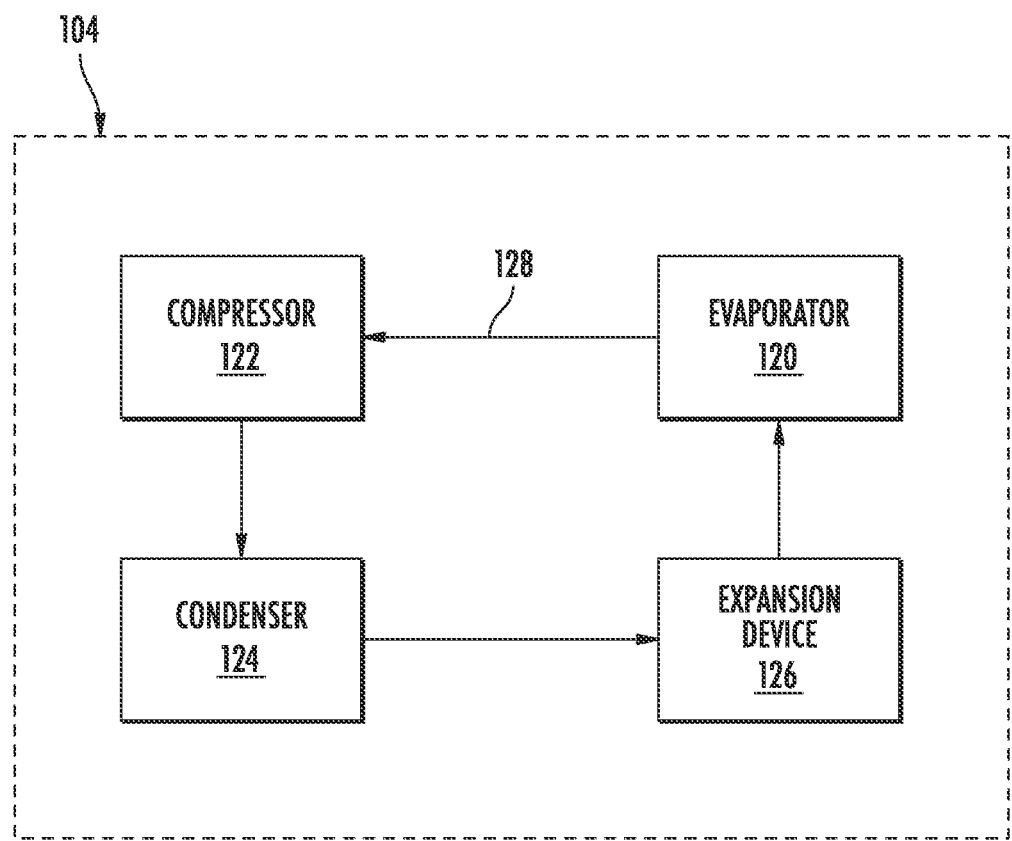
FIG. 4 provides a schematic view of a portion of an air conditioning system according to an exemplary embodiment of the present disclosure.

Referring now generally to FIGS. 2 through 4, the operation of air conditioning system 104 will be described in more detail according to exemplary embodiments of the present subject matter. In this regard, FIG. 2 illustrates a top, perspective view of air conditioner 104 of recreational vehicle 100 with outer grill 108 removed to reveal internal working components of air conditioner 104. As illustrated, air conditioning system 104 generally includes an indoor bulkhead or indoor cover 110 that divides air conditioning system 104 between an indoor and outdoor portion, such as in a packaged terminal air conditioner unit (PTAC) or a split heat pump system. Specifically, indoor cover 110 defines and indoor air plenum 112 and an outdoor air plenum 114. In this regard, indoor cover 110 generally shields the indoor components of air conditioning system 104 from the outdoor environment 116.

Referring now also to FIG. 3, indoor cover 110 is removed to reveal additional working components of air conditioning system 104. In addition, FIG. 4 illustrates a schematic view of air conditioning system 104. Relevant components of air conditioning system 104 will now be described. It should be understood that air conditioning system 104 includes various heat pump components, such as a sealed system, for treating air within an interior of an associated recreational vehicle 100. Such components are well understood by those skilled in the art and a description of such components is omitted for the sake of brevity.

In this regard, for example, air conditioning system 104 includes refrigerant circulating between an evaporator or indoor coil 120, compressor 122, condenser or outdoor coil 124, and expansion device 126, as shown in the refrigeration loop 128 of air conditioning system 104 in FIGS. 2 through 4. Refrigerant, also known as coolant, carries heat from the passenger compartment 102 of recreational vehicle 100 to the outdoors 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized. For example, according to an exemplary embodiment, the refrigerant may be R-410A or another refrigerant.

The refrigerant begins by passing through evaporator 120 in liquid form. Ambient air or air from the passenger compartment 102 may pass over evaporator 120, e.g., as motivated by an evaporator air handler. More specifically, as illustrated, air conditioning assembly 104 may include an indoor fan 130 configured for urging a flow of indoor air. Because the liquid refrigerant is cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well-above the ambient temperature outside of recreational vehicle 100. From compressor 122, the heated refrigerant is delivered to condenser 124. Air may pass over condenser 124, e.g., as motivated from a condenser air handler. More specifically, as illustrated, air conditioning system 104 may include an outdoor fan 132 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process.

Recreational vehicle 100 may further include a controller 140. Controller 140 may control various operations within recreational vehicle, such as air conditioning unit 104. Controller 140 may be provided at any suitable location within recreational vehicle 100, and may be operably coupled (e.g., electrically or wirelessly coupled) to air conditioning unit 104. Further, controller 140 may be operably coupled to one or more sensor assemblies 136, such as a temperature sensor (e.g., thermistor, thermocouple, etc.), humidity sensor (e.g., hygrometer), etc., to detect a corresponding condition of passenger compartment 102 and transmit one or more signals according to the same, as would be understood.

In certain embodiments, a control panel 142 is provided (e.g., within passenger compartment 102) to present or receive user inputs for instructions related to operation of air conditioning assembly 104. In turn, control panel 142 may include a display screen 144 or one or more user input elements 146 (e.g., buttons, knobs, graphical user interface icons, etc.). Display screen 144 may, for example be a touchscreen or other text-readable display screen 144 to provide an indication of one or more conditions related to air conditioning assembly 104 (e.g., sensor reading, mode setting, fan state, temperature setting, etc.). Generally, in response to user manipulation of control panel 142 or one or more sensor signals, controller 140 may operate various components of air conditioning assembly 104. For instance, a user operating control panel 142 may select a set temperature desired within recreational vehicle 100. Additionally or alternatively, the user may select an operating mode of air conditioning system 104. For example, a user may select a Heat Pump (HP) mode (e.g., to provide heated air to passenger compartment 102) or a cooling (COOL) mode (e.g., to provide cooled air to passenger compartment 102).

In some embodiments, controller 140 includes one or more memory devices and one or more processors. The processors can be any combination of general or special purpose processors, CPUs, or the like that can execute programming instructions or control code associated with operation of recreational vehicle 100. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 140 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 140 includes a network interface such that controller 140 can connect to and communicate over one or more wireless networks with one or more network nodes. Controller 140 can also include one or more transmitting, receiving, or transceiving components for transmitting/receiving communications with other devices communicatively coupled with recreational vehicle 100. Additionally, or alternatively, one or more transmitting, receiving, or transceiving components can be located off board controller 140.

Optionally, controller 140 may be connected to a separate microcontroller of control panel 142 (e.g., including display screen 144) through one or more intermediate bussing connection. For instance, a CAN bus may be used to connect controller 140 associated with air conditioning assembly 104 to the microcontroller of control panel 142. Advantageously, controller 140 may be configured to or adaptable to work with a variety of manufactured displays (e.g., having different models or manufacturers).

Recreational vehicle 100 may further include an interior electronic sensor 136 (i.e., assembly sensor) provided in passenger compartment 102. During use, interior electronic sensor 136 may generally sense or measure one or more atmospheric conditions (e.g., temperature, humidity, etc.) within passenger compartment 102. Interior electronic sensor 136 may then transmit the atmospheric condition data to controller 140 (e.g., as one or more interior temperature signals). For instance, in the case of a temperature sensor, such as a thermistor or thermocouple included with interior electronic sensor 136, one or more voltages corresponding to temperature at the sensor 136 may be transmitted along a wired path to controller 140, wherein the received voltages can be used to calculate the corresponding temperature. Accordingly, an interior electronic of passenger compartment 102 may be continually monitored (e.g., during activation or use of air conditioner 104).

Figure 5:
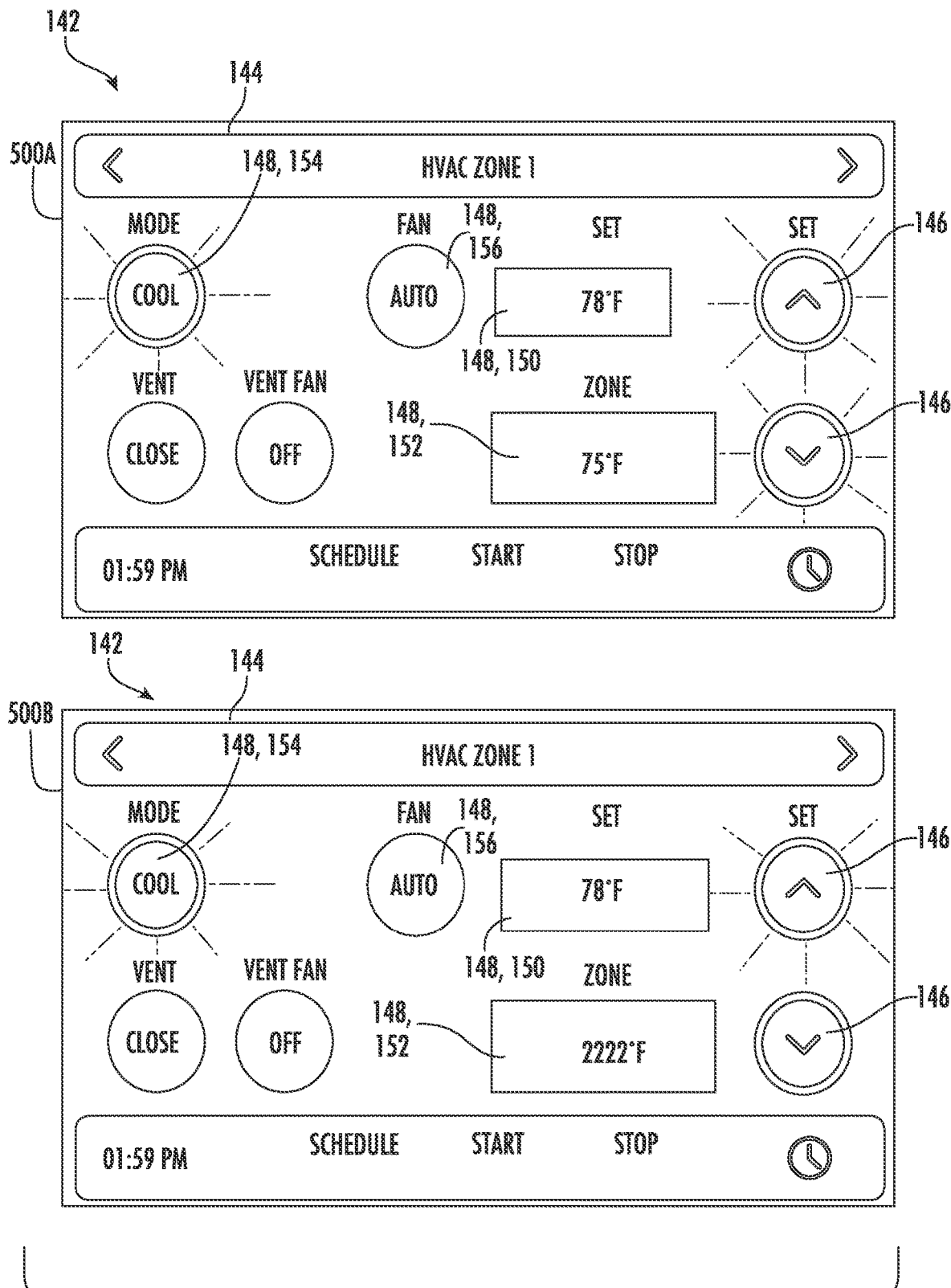
FIG. 5 provides a plan view of a control panel display alternated between a non-anomalous state and an anomalous state according to exemplary embodiments of the present disclosure.
Figure 6:
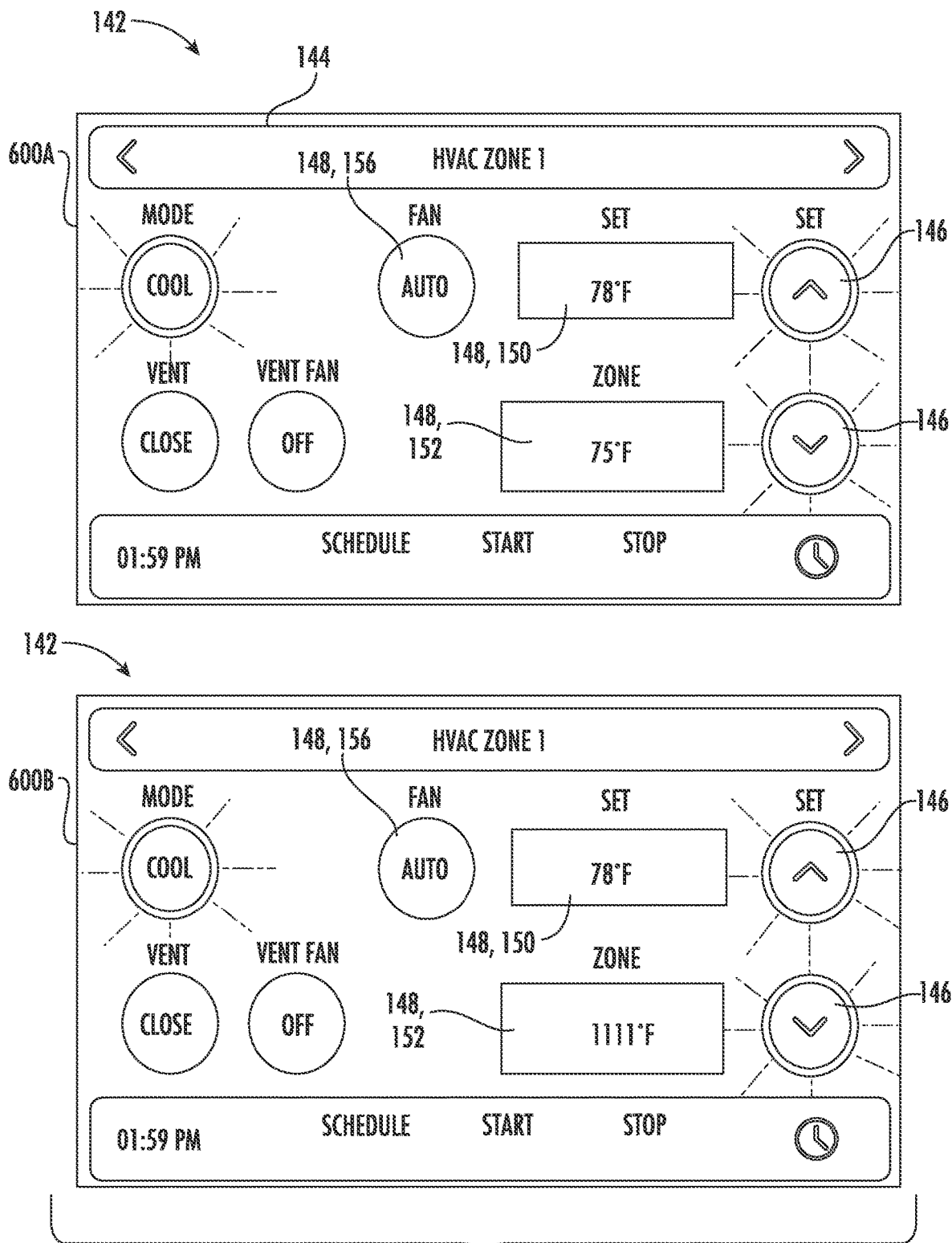
FIG. 6 provides a plan view of a control panel display alternated between a non-anomalous state and an anomalous state according to exemplary embodiments of the present disclosure.
Figure 7:
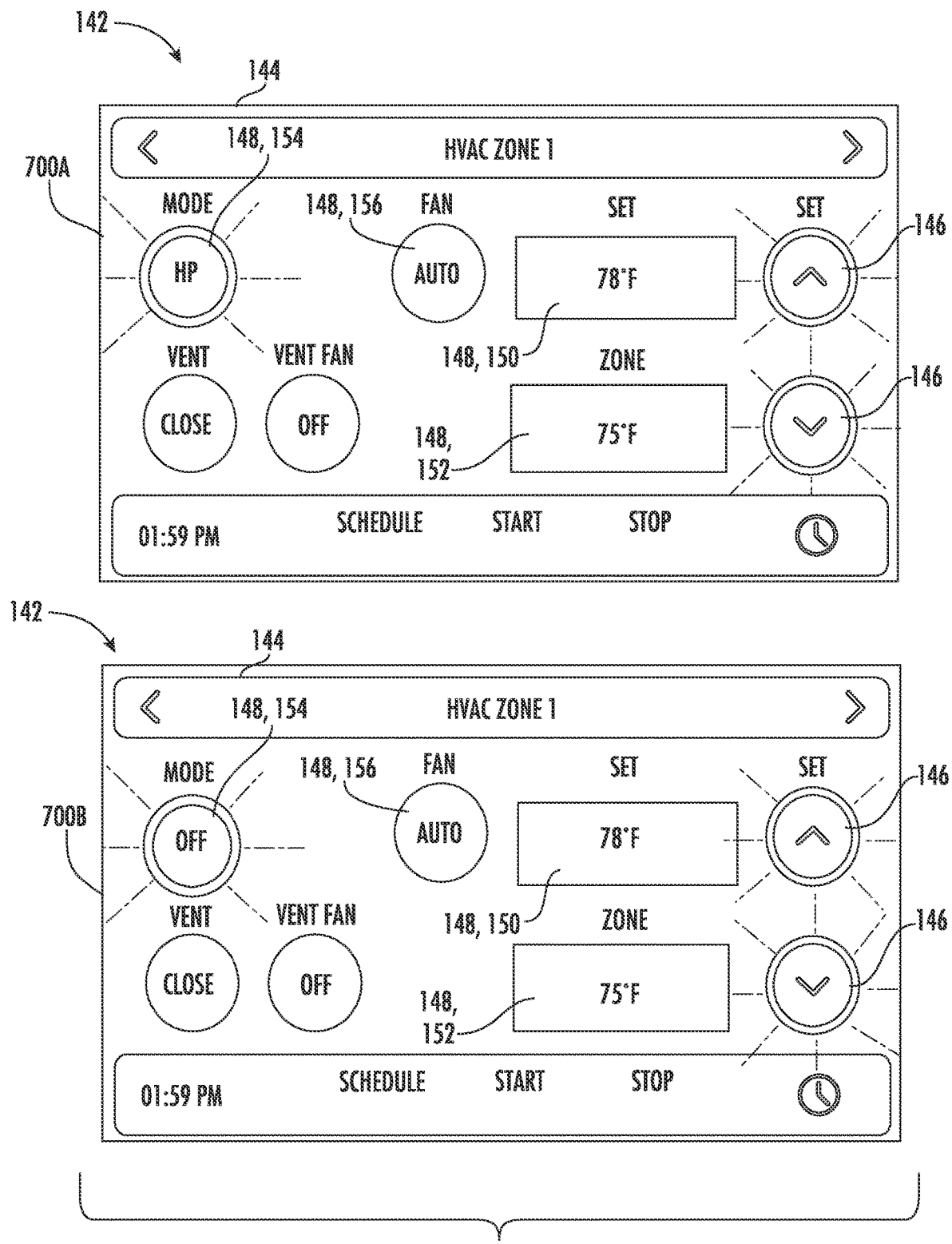
FIG. 7 provides a plan view of a control panel display alternated between a non-anomalous state and an anomalous state according to exemplary embodiments of the present disclosure.

Turning now to FIGS. 5 through 7, control panel 142 may include a display screen 144 having one or more discrete output fields 148 for presenting one or more conditions of the air conditioning assembly 104. Generally, each discrete output field 148 may include a predefined region of display screen 144 at which a variable field value (e.g., in the form of one or more numbers or text) can be presented. Optionally, each discrete output field 148 may be configured to only present a predetermined set of values (e.g., range of values, a programmed group of words, etc.). Additionally or alternatively, the predetermined set of values may be programmed or stored locally (e.g., on the microcontroller of control panel 142 or display 144).

In the illustrated embodiments, the output fields 148 include a temperature setting field 150 within which a selected temperature value can be presented, a temperature reading field 152 within which a detected temperature value (e.g., based on a signal received from a sensor 136—FIG. 1) can be presented, an assembly mode field 154 within which a selected operating mode (e.g., HP, COOL, or OFF) can be presented, a fan setting field 156 within which a selected fan mode (e.g., AUTO, ON, or OFF) can be presented. As illustrated, various other output fields may be provided as well. Moreover, further or different output fields may be provided, as would be understood.

During typical (e.g., non-anomalous) operations, display screen 144 may be directed (e.g., by controller 140) to a non-anomalous state. Examples of such states are illustrated at 500A, 600A, and 700A. In the non-anomalous state, the output fields 148 of display screen 144 may present values corresponding to the specific condition with which they are associated. Thus, temperature setting field 150 may present a temperature value that a user has selected, temperature reading field 152 may present a temperature value that has been detected according to a signal from sensor 136, assembly mode field 154 may present the selected operating mode, and fan setting field 156 may present the selected fan mode.

Following detecting of an anomaly, however, one or more of the output fields 148 may be changed. Specifically, the display screen 144 may be directed to an anomalous state. Examples of such states are illustrated at 500B, 600B, and 700B. In the anomalous state, one or more output fields 148 may be changed to a predetermined field value. In turn, the value that was selected or detected for the corresponding condition of one or more of the output fields 148 may be changed to a different value that has been predetermined and, for instance, programmed into controller 140. In some such embodiments, the predetermined field value may be far outside (e.g., two or more times greater/lesser) the acceptable or physically possible values for the condition to which an output field 148 is associated. For instance, in the case of a temperature field, the predetermined field value may exceed 150 (e.g., in degrees Fahrenheit), such as 2222 (illustrated at 500B) or 1111 (illustrated at 500B).

Optionally, the controller 140 may alternate between the non-anomalous variable field value and the anomalous predetermined field value (e.g., according to a predetermined rate or pattern of alternating, which may further correspond to the detected anomaly). Notably, a user may be able to readily discern that an anomaly has been detected and is being indicated at controller 140. In some embodiments, a chart is provided to a user to decode or discern what anomaly is indicated by a particular predetermined field value or rate/pattern of alternating.

Generally, controller 140 may be configured to detect various potential anomalies. To that end, a plurality of potential anomalies may be programmed within controller 140. One anomaly may include a short-circuiting of an assembly sensor (e.g., sensor 136). An additional or alternative anomaly may include a disconnection or a detected unplugged state of an assembly sensor (e.g., sensor 136). Another additional or alternative anomaly is an excessive runtime of one or more components (e.g., such that freezing might occur at a portion of refrigeration loop 128). Yet another additional or alternative anomaly is a determination of a defrost requirement for a portion of refrigeration loop 128. Still another additional or alternative anomaly is a determination of a defrost lockout for a portion of refrigeration loop 128.

In embodiments wherein a programmed plurality of potential anomalies are provided, different changes to one or more of the output fields 148 may be applied. Thus, multiple predetermined field values may be programmed within controller 140. In some such embodiments, each predetermined field value correspond to a discrete anomaly of the plurality of programmed potential anomalies. Thus, one (e.g., first) predetermined field value or anomalous state may correspond to one (e.g., first) anomaly while another (e.g., second) predetermined field value or anomalous state corresponds to another (e.g., second). As an example, the anomalous state of 500B and changed predetermined value of 2222 at temperature setting field 152 may indicate a temperature sensor at the indoor coil 120 (FIG. 3) has short circuited. As an additional or alternative example, the anomalous state of 600B and changed predetermined value of 1111 at temperature setting field 152 may indicate a temperature sensor at the indoor coil 120 (FIG. 3) has become unplugged or disconnected from controller 140. As another additional or alternative example, the anomalous state of 700B and changed predetermined value "OFF" at operating mode field 154 may indicate a heat pump defrost lockout has been triggered.

Figure 8:
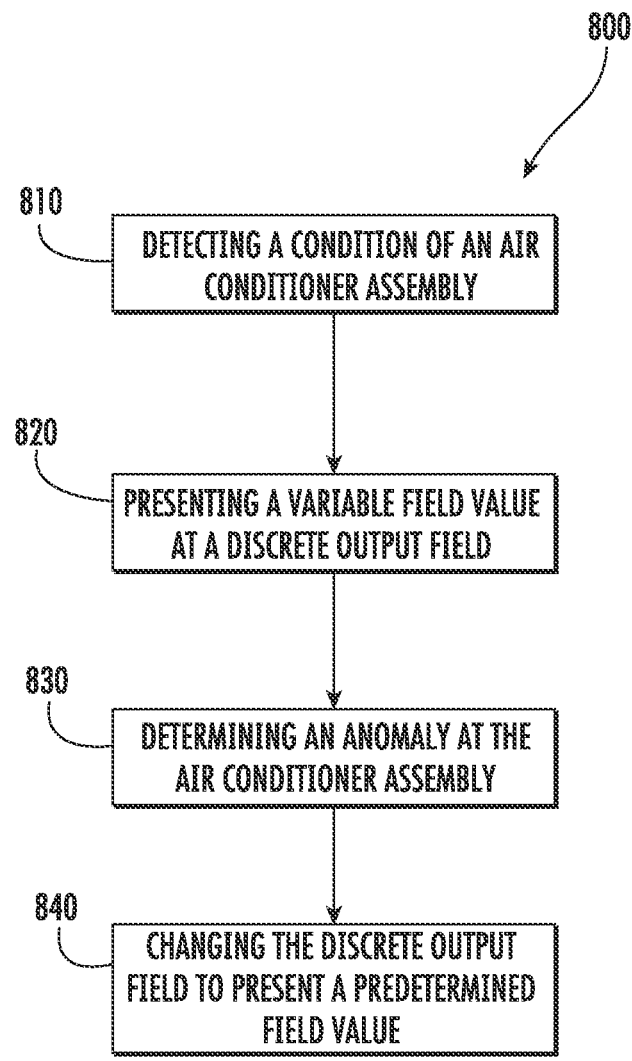
FIG. 8 provides a flow chart illustrating a method of operating an air conditioning assembly according to exemplary embodiments of the present disclosure.

Referring now to FIG. 8, the present disclosure may further be directed to methods (e.g., method 800) of operating an air conditioning assembly, such as air conditioning assembly 104 for a recreational vehicle 100. In exemplary embodiments, the controller 140 may be operable to perform various steps of a method in accordance with the present disclosure.

The methods (e.g., 800) may occur as, or as part of, a system operation (e.g., a cooling or heating operation) of the air conditioning assembly. In particular, the methods disclosed herein may advantageously improve communication of information regarding an anomaly. Additionally or alternatively, such information may advantageously be communicated on a display screen that does not have a dedicated field for showing anomaly information. Moreover, the information may be communicated through a variety of different displays (e.g., having different models or manufacturers). It is noted that the order of steps within method 800 are for illustrative purposes. Except as otherwise indicated, one or more steps in the below method 800 may be changed, rearranged, performed in a different order, or otherwise modified without deviating from the scope of the present disclosure.

At 810, the method 800 includes detecting a condition of the air conditioner assembly. In particular, the detected condition may correspond to a discrete output field and, thus, be characterized as a detected corresponding condition. The detected corresponding condition may include or be provided as a sensed condition (e.g., detected at an assembly sensor) or a set condition (e.g., setting provided by a user). In some such embodiments, 810 includes receiving a condition signal from an assembly sensor configured to sense the corresponding condition. For instance, the assembly sensor may be a temperature sensor configured to detect the temperature (e.g., in the passenger compartment, on one or more heat exchange coils, etc.). In turn, the discrete output field may be a temperature field. In additional or alternative embodiments, 810 includes receiving a condition signal from a user input to indicate a desired operation of the air conditioner assembly. For instance, the condition signal may indicate a desired operating mode, fan mode, or other user-specified setting.

At 820, the method 800 includes presenting a variable field value at the discrete output field. Specifically, the variable field value may be based on the detected corresponding condition. Thus, a discrete output field that is a temperature field may present a numerical value indicating temperature (e.g., detected or set temperature). Similarly, a discrete output field that is a mode field may present a value as text (e.g., "HP," "COOL," "OFF," etc.) to indicate a selected mode.

At 830, the method 800 includes determining an anomaly at the air conditioner assembly. An anomaly may be determined, for instance, based on a newly-received sensor signal that indicates a value that exceeds or is below a predefined operating range (e.g., between −50° Fahrenheit and 150° Fahrenheit) or detection of an anomaly-trigger event. Generally, such events and detection thereof are known, and the present disclosure is not limited to detection of any particular trigger event. As described above, the determined anomaly may include a short-circuiting of an assembly sensor, a disconnection or a detected unplugged state of an assembly sensor, an excessive runtime of one or more components (e.g., such that freezing might occur at a portion of refrigeration loop), a defrost requirement for a portion of refrigeration loop, or a defrost lockout. Optionally, a plurality of programmed potential anomalies may be provided. Thus, the determination at 830 may include selecting one or more anomalies of the plurality of programmed potential anomalies.

At 840, the method 800 includes changing the discrete output field to present a predetermined field value. Specifically, the predetermined field value may replace the discrete output field in response to determining the anomaly. As described above, the predetermined field value may be far outside the acceptable or physically possible values for the condition to which an output field is associated.

In optional embodiments, 840 includes alternating between presentation of the variable field value and the predetermined field value. In other words, the presentation at the discrete output field may switch back and forth between the variable field value and the predetermined field value.

Thus, the last legitimate sensor reading or setting of the discrete output field may be shown at an alternating pattern or rate with the predetermined field value. In some such embodiments, alternating may be repeated (e.g., continue) according to a predetermined rate or pattern of alternating. Optionally, the rate or pattern may correspond to the determined anomaly.

In some embodiments, the determined anomaly of 820 is one (e.g., a first) anomaly of a plurality of programmed potential anomalies. In turn, 830 may include selecting a first predetermined field value of a plurality of predetermined field values. Moreover, each predetermined field value may correspond to a discrete or different anomaly of the plurality of programmed potential anomalies (e.g., to be presented at the same discrete output field or a different output field). In turn, a user may be able to know what anomaly has been determined out of all of the possible anomalies. In some such embodiments, a chart is provided to a user to decode or discern what anomaly is indicated by the first predetermined field value—and one or more of the other predetermined field values.

In certain embodiments, multiple distinct output fields (e.g., a first output field and a second output field) are provided on the display screen for displaying values for different corresponding conditions. In turn, the method 800 may further provide for presenting a second predetermined value at the second output field based on another (e.g., second) anomaly (e.g., similar to the above-described first anomaly and predetermined field value). As a result, the method 800 may further include detecting a second corresponding condition of the air conditioner assembly; presenting a variable field value at the second output field based on the detected second corresponding condition; determining a second anomaly at the air conditioner assembly of the plurality of programmed potential anomalies; and changing the second output field to present a predetermined field value in response to determining the second anomaly. Similar steps may be performed for additional (e.g., third, fourth, etc.) output fields or anomalies, as would be understood in light of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioning assembly for a recreational vehicle, the air conditioning assembly comprising:
    a sealed refrigeration system mounted to the recreational vehicle;
    a display screen mounted to the recreational vehicle, the display screen defining a discrete output field; and
    a controller in operable communication with the sealed refrigeration system and the display screen, the controller being configured to initiate a system operation comprising
        detecting a corresponding condition of the air conditioning assembly,
        presenting a variable field value at the discrete output field based on the detected corresponding condition,
        determining an anomaly at the air conditioning assembly, and
        changing the discrete output field to present a predetermined field value in response to determining the anomaly.

2. The air conditioning assembly of claim 1, further comprising an assembly sensor in operable communication with the controller and configured to sense the corresponding condition, wherein detecting the corresponding condition comprises receiving a condition signal from the assembly sensor.

3. The air conditioning assembly of claim 2, wherein the assembly sensor is a temperature sensor and wherein the discrete output field is a temperature field.

4. The air conditioning assembly of claim 1, wherein detecting the corresponding condition comprises receiving a condition signal from a user input to indicate a desired operation of the air conditioning assembly.

5. The air conditioning assembly of claim 1, wherein changing the discrete output field comprises alternating between presentation of the variable field value and the predetermined field value.

6. The air conditioning assembly of claim 5, wherein alternating is repeated according to a predetermined rate of alternating.

7. The air conditioning assembly of claim 1, further comprising an assembly sensor in operable communication with the controller, wherein the anomaly comprises a short-circuiting of the assembly sensor.

8. The air conditioning assembly of claim 1, further comprising an assembly sensor in operable communication with the controller, wherein the anomaly comprises an unplugged state of the assembly sensor.

9. The air conditioning assembly of claim 1, wherein determining the anomaly comprises detecting a first anomaly of a plurality of programmed potential anomalies, and wherein changing the discrete output field comprises selecting a first predetermined field value of a plurality of predetermined field values, each predetermined field value of the plurality of predetermined field values corresponding to a discrete anomaly of the plurality of programmed potential anomalies.

10. The air conditioning assembly of claim 1, wherein the discrete output field is a first output field, wherein the corresponding condition is a first corresponding condition, wherein the display screen further defines a second output field to present a variable field value based on a second corresponding condition of the air conditioning assembly, wherein determining the anomaly comprises detecting a first anomaly of a plurality of programmed potential anomalies, and wherein the system operation further comprises
    detecting the second corresponding condition of the air conditioning assembly,
    presenting a variable field value at the second output field based on the detected second corresponding condition,
    determining a second anomaly at the air conditioning assembly of the plurality of programmed potential anomalies, and
    changing the second output field to present a predetermined field value in response to determining the second anomaly.

11. An air conditioning assembly for a recreational vehicle, the air conditioning assembly comprising:
    an assembly sensor;
    a display screen mounted to the recreational vehicle, the display screen defining a discrete output field; and a controller in operable communication with the assembly sensor and the display screen, the controller being configured to initiate a system operation comprising
detecting a corresponding condition of the air conditioning assembly,
presenting a variable field value at the discrete output field based on the detected corresponding condition,
determining an anomaly at the air conditioning assembly, and
changing the discrete output field to present a predetermined field value in response to determining the anomaly,
wherein determining the anomaly comprises detecting a first anomaly of a plurality of programmed potential anomalies, and
wherein changing the discrete output field comprises selecting a first predetermined field value of a plurality of predetermined field values, each predetermined field value of the plurality of predetermined field values corresponding to a discrete anomaly of the plurality of programmed potential anomalies.

12. The air conditioning assembly of claim 11, wherein the assembly sensor is configured to sense the corresponding condition, wherein detecting the corresponding condition comprises receiving a condition signal from the assembly sensor.

13. The air conditioning assembly of claim 12, wherein the assembly sensor is a temperature sensor and wherein the discrete output field is a temperature field.

14. The air conditioning assembly of claim 11, wherein detecting the corresponding condition comprises receiving a condition signal from a user input to indicate a desired operation of the air conditioning assembly.

15. The air conditioning assembly of claim 11, wherein changing the discrete output field comprises alternating between presentation of the variable field value and the predetermined field value.

16. The air conditioning assembly of claim 15, wherein alternating is repeated according to a predetermined rate of alternating.

17. The air conditioning assembly of claim 11, further comprising an assembly sensor in operable communication with the controller, wherein the anomaly comprises a short-circuiting of the assembly sensor.

18. The air conditioning assembly of claim 11, further comprising an assembly sensor in operable communication with the controller, wherein the anomaly comprises an unplugged state of the assembly sensor.

19. The air conditioning assembly of claim 11, wherein the discrete output field is a first output field, wherein the corresponding condition is a first corresponding condition, wherein the display screen further defines a second output field to present a variable field value based on a second corresponding condition of the air conditioning assembly, wherein determining the anomaly comprises detecting a first anomaly of a plurality of programmed potential anomalies, and wherein the system operation further comprises
detecting the second corresponding condition of the air conditioning assembly,
presenting a variable field value at the second output field based on the detected second corresponding condition,
determining a second anomaly at the air conditioning assembly of the plurality of programmed potential anomalies, and
changing the second output field to present a predetermined field value in response to determining the second anomaly.

20. An air conditioning assembly for a recreational vehicle, the air conditioning assembly comprising:
a temperature sensor;
a display screen mounted to the recreational vehicle, the display screen defining a discrete output field comprising a temperature field; and
a controller in operable communication with the temperature sensor and the display screen, the controller being configured to initiate a system operation comprising
detecting a temperature condition at the temperature sensor,
presenting a variable field value at the discrete output field based on the detected temperature condition,
determining an anomaly at the air conditioning assembly, and
changing the discrete output field to present a predetermined field value in response to determining the anomaly.

* * * * *